Oct. 12, 1937.   R. W. MUELLER   2,095,395
BALANCED THROTTLE VALVE
Filed Oct. 13, 1933
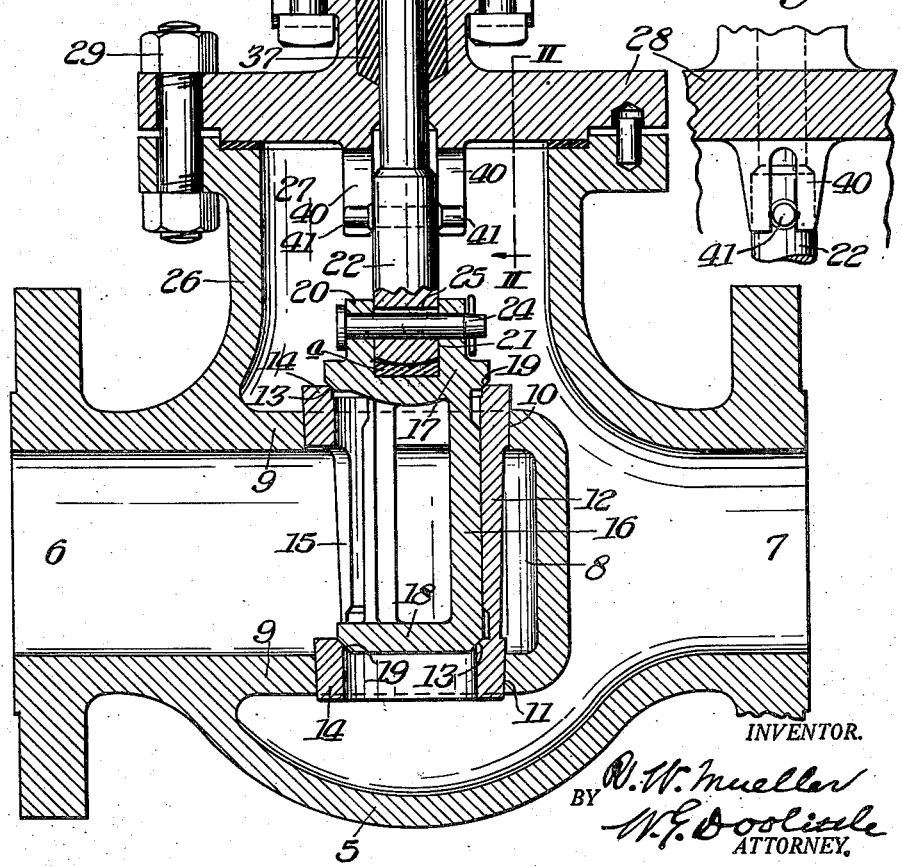
INVENTOR.
BY R. W. Mueller
W. G. Doolittle
ATTORNEY.

Patented Oct. 12, 1937

2,095,395

UNITED STATES PATENT OFFICE 2,095,395

BALANCED THROTTLE VALVE

Richard W. Mueller, Pittsburgh, Pa., assignor to Kerotest Manufacturing Company, Pittsburgh, Pa., a corporation of Pennsylvania Application October 13, 1933, Serial No. 693,461

2 Claims. (Cl. 251—81)

This invention relates to improvements in valves, and more particularly to balanced throttle valves of a type especially designed for controlling the operation of engines employed, for example, in drilling operations wherein quick opening, sensitive control, ease of operation, perfect balance, and durability are required.

My invention also contemplates a valve assembly for use in either high pressure or low pressure service, and adaptable for superheated or saturated steam, and including a non-rotatable rising stem translated by a threaded member having thrust bearings to eliminate friction and strain located outside of the valve body and readily accessible; a valve stem and associated parts in which end play is practically eliminated; a non-rotatable double-seating valve having spaced-apart seat contacting faces or members; and a removable valve cage having seats for cooperation with the seat contacting faces.

In the accompanying drawing, which illustrates an application of my invention:

Fig. 1 is a central vertical sectional view of a valve embodying my invention; and Fig. 2, a part sectional and a part elevational view taken on line II—II of Fig. 1.

Referring to the drawing, 5 designates a hollow body or casing having aligned inlet and outlet ports or passages 6 and 7, and a fluid chamber or chest 8 in open communication with the inlet port 6. Opposite walls 9 of the chest are formed with aligned openings 10 and 11, the walls of which are preferably slightly tapered, adapted to have entered therein a valve cage 12 having spaced-apart valve seats 13, preferably inclined, disposed in planes above the planes of the openings 10 and 11 respectively when the cage is positioned in the said openings. The cage preferably has slightly tapered ring portions 14 which have a friction fit in the walls of the openings 10 and 11, and are of sufficient depth to assure that the cage will be fixedly maintained in the desired operative position until it is desired to remove the cage, thus dispensing with any additional means for maintaining the cage in operative position.

As illustrated and as preferred, the cage is in the form of a hollow sleeve having openings 15 in the walls thereof between the two annular portions 14, and is designed for cooperation with a hollow open-sided plug valve member 16, formed with circular spaced-apart portions 17 and 18, each having an inclined seating face 19 for cooperation with the respective inclined seats 13 of the sleeve.

Above the portion 17, the valve has an annular wall 20 and a stem-receiving socket 21, the latter being designed to receive an enlarged end portion 22 of a non-rotatable rising operating stem 23.

By means of this construction, I am enabled to employ a disk $a$, formed of hard steel or other suitable wear-resisting metal, within the socket 21 upon which the lower end of the stem has its bearing. The stem is attached to the valve by means of a pin 24 passed through openings in the wall 20 and an opening 25 in the portion 22, said opening 25 having a diameter greater than the diameter of the pin so that when closing the valve, no load is transferred to the pin but is carried solely on the hardened disk $a$ and the hardened lower end portion 22.

Located at one side of the valve chest and within the body, and formed by the portion 26 of the body, is a chamber 27. This chamber or passage is of relatively large area and is closed by a closure member, plate or bonnet 28 detachably secured to a flanged portion of the body 26 by a series of bolts 29. The operating stem 23 extends outwardly through the bonnet or member 28 and has a threaded portion 30 designed for cooperation with an internally threaded elongated sleeve 31, rotatably mounted on the yoke 32 of member 28 within a double thrust ball bearing device, generally designated 33, mounted within a large open-ended boss 34 of the yoke. Sleeve 31 projects through the bearing and has a stud or key 35 for receiving and retaining a hand-wheel 36 thereon.

37 designates a packing for the stem packed between a follower 38 and the bonnet, said follower being secured to the bonnet by screw bolts 39. As shown, the rotation of the operating stem is prevented by means of slotted lugs 40 depending from the bonnet or closure plate, and pins or projections 41 on portion 22 of the stem entered in the slotted lugs.

Attention is particularly called to the manner of connecting the enlarged end portion 22 of the operating stem to the valve proper and to the thrust bearings cooperating with the stem-actuating sleeve 31, whereby I have practically eliminated all end play of the stem, and thus produced a very sensitive control and a durable construction.

I claim:

1. In a balanced throttle valve, a valve assembly including a body, a closure on the body, a chest in the body, alined ports in opposite sides of the chest, a valve cage independent of said closure and friction fitted within the ports, valve seats on the cage, a balanced throttle valve bridging and adapted to control the ports having spaced apart seat-contacting members and a stem receiving socket, a non-rotatable rising stem having a threaded portion outside of the body and a portion within said socket, said socket and stem portion having alined openings, a pin passing through said openings, the side of the opening through said stem portion being spaced farther from the bottom of the socket than the upper side of the pin when the stem portion is in engagement with said bottom to cause the end of the stem to press against a wall of the socket and thereby carry the load when closing the valve, centrally disposed interengaging means on the stem and closure within the body and below the closure to prevent turning of the stem, rotatable stem actuating means cooperating with the threaded portion, and thrust bearing means for the actuating means.

2. In a balanced throttle valve, a valve assembly including a body, a closure on the body, a chest in the body, alined ports in opposite sides of the chest, a valve cage independent of said closure and friction fitted within the ports, valve seats on the cage, a balanced throttle valve bridging and adapted to control the ports having spaced apart seat-contacting members and a stem receiving socket, a wear plate in the socket, a non-rotatable rising stem having a threaded portion outside of the body and an enlarged cylindrical portion within said socket, said socket and enlarged cylindrical portion having alined openings, a pin passing through said openings, the side of the opening through said enlarged stem portion being spaced farther from the bottom of the socket than the upper side of the pin when the cylindrical portion is in engagement with said wear plate to cause the end of the stem to press against a wall of the socket and thereby carry the load when closing the valve, centrally disposed interengaging means on the stem and closure within the body and below the closure to prevent turning of the stem, rotatable stem actuating means cooperating with the threaded portion, and thrust bearing means for the actuating means.

RICHARD W. MUELLER.